United States Patent [19]
Jacobson et al.

[11] Patent Number: 6,167,397
[45] Date of Patent: Dec. 26, 2000

[54] METHOD OF CLUSTERING ELECTRONIC DOCUMENTS IN RESPONSE TO A SEARCH QUERY

[75] Inventors: Guy Jacobson, Bridgewater; Balachander Krishnamurthy, Chatham; Divesh Srivastava, Summit, all of N.J.

[73] Assignee: AT&T Corporation, New York, N.Y.

[21] Appl. No.: 08/935,827

[22] Filed: Sep. 23, 1997

[51] Int. Cl.[7] .................................................. G06F 17/30
[52] U.S. Cl. ............................................................. 707/5
[58] Field of Search ............................................. 707/1–5

[56] References Cited

U.S. PATENT DOCUMENTS

| | | | |
|---|---|---|---|
| 5,483,650 | 1/1996 | Pederson et al. | 707/2 |
| 5,542,090 | 7/1996 | Henderson et al. | 707/2 |
| 5,598,557 | 1/1997 | Doner et al. | 707/5 |
| 5,659,766 | 8/1997 | Saund et al. | 704/9 |
| 5,675,819 | 10/1997 | Schuetze | 704/10 |
| 5,787,420 | 7/1998 | Tukey et al. | 707/5 |
| 5,787,421 | 7/1998 | Nomiyama | 707/5 |
| 5,787,422 | 7/1998 | Tukey et al. | 707/5 |
| 5,819,258 | 10/1998 | Vaithyanathan et al. | 707/2 |
| 5,835,087 | 11/1998 | Herz et al. | 345/327 |
| 5,845,278 | 12/1998 | Kirsch et al. | 707/3 |
| 5,857,179 | 1/1999 | Vaithyanathan et al. | 707/2 |
| 5,864,855 | 1/1999 | Ruocco et al. | 707/10 |
| 5,890,152 | 3/1999 | Rapaport et al. | 707/6 |
| 5,924,090 | 7/1999 | Krellenstein et al. | 707/5 |
| 5,926,812 | 7/1999 | Hilsenrath et al. | 707/5 |

*Primary Examiner*—Maria N. Von Buhr
*Attorney, Agent, or Firm*—Kenyon & Kenyon

[57] ABSTRACT

A method of presenting clusters of documents in response to a search query where the documents within a cluster are determined to be related to one another. This relationship is assessed by comparing documents which match one or more terms in the query to determine the extent to which the documents have commonality with respect to terms appearing infrequently in the collection of documents. As a consequence, the cluster of documents represents a response or query result that is split across multiple documents. In a further variation the cluster can be constituted by a structured document and an unstructured document.

23 Claims, 2 Drawing Sheets

METHOD OF CLUSTERING ELECTRONIC DOCUMENTS IN RESPONSE TO A SEARCH QUERY

BACKGROUND OF THE INVENTION

The present invention is directed to a method for clustering electronic documents in response to a search query. More specifically, the invention is directed to a method in which a cluster of documents is provided as a search result when the search query has not completely matched any documents, but, portions of the query are found to match a number of documents.

With the proliferation of electronic information sources it has been necessary to provide searching capabilities to enable users to look for information of interest in large collections of documents. It is well known to provide search engines for searching for pages on the World Wide Web. These pages are commonly referred to as unstructured documents. Examples of such search engines include Yahoo, Infoseek and others. It is also known to conduct searches across structured documents which may be found in databases. Several tools exist for searching in structured documents as well. Such searching often involves a forms-based interface for specifying attribute/value pairs (e.g., in a database such as white pages the attribute/value pair could be name/phone numbers).

In connection with searches of unstructured documents such as on the World Wide Web, the search engines do an effective job of finding many possible matches. However, the number of matches is often quite large and it is difficult to retrieve each of the documents to locate the few of particular interest. As an example, a search engine like Altavista or Lycos returns a ranked list of documents in response to a keyword-based query and the score of the document is based on the "similarity" of the document to the query keywords. Consider an example query of "rosehips cancer" where the user wants to discovery if rosehips (the tiny fruits left after rose petals fall) can help in the cure for cancer. The term counts of rosehips and cancer range in the tens of thousands. Given this as a result it is difficult for the user to search among the documents to find other information which might appear infrequently in the documentation. For example, it is difficult to obtain from this set documents that deal with using rosehips in cancer treatment unless the terms are found in the same document. It would be very useful if such sets of related documents could be automatically clustered and returned in response to the query, that is if a split match of the query (multiple documents that together satisfy the query) could be provided.

In a similar vein, in connection with sets of structured and unstructured documents it is possible that information is present partially in a structured document and partially in an unstructured document. Presently, there are no search mechanisms to locate such information.

SUMMARY OF THE INVENTION

The present invention provides a method for clustering documents in answer to a query, joining those documents that share infrequently occurring terms. More specifically, in accordance with the present invention, the search engine provides a ranked list of document clusters rather than individual documents in response to a query. Each document returned by the search as part of the answer list is required to match some or all of the query words and hence would have been part of the list of documents returned by the traditional approach. However, the present invention further computes an inter-document similarity beyond the computation of the documents to the query keywords. This enables the creation of document clusters.

In accordance with the method of the present invention, a universe of documents is first searched using an inverted index to locate documents that match the query keywords. Second, the similarity of document pairs is computed based on the occurrence of infrequently occurring words in the vicinity of query keywords in documents. Documents are clustered and assigned scores based on the diversity of matches of documents in the cluster to the query keywords and the similarity between pairs of documents in the cluster.

In a further embodiment of the present invention, the capability of finding split matches across structured and unstructured documents is also provided. In this embodiment the clusters constitute pairings of unstructured documents and structured documents which are compared to one another and scored in a manner similar to that described above. The paired documents are then ranked in order again relying on the concept of the diversity of matches of documents in the cluster to the query keywords and the similarity between pairs of documents in the cluster.

DETAILED DESCRIPTION

Figure 1:
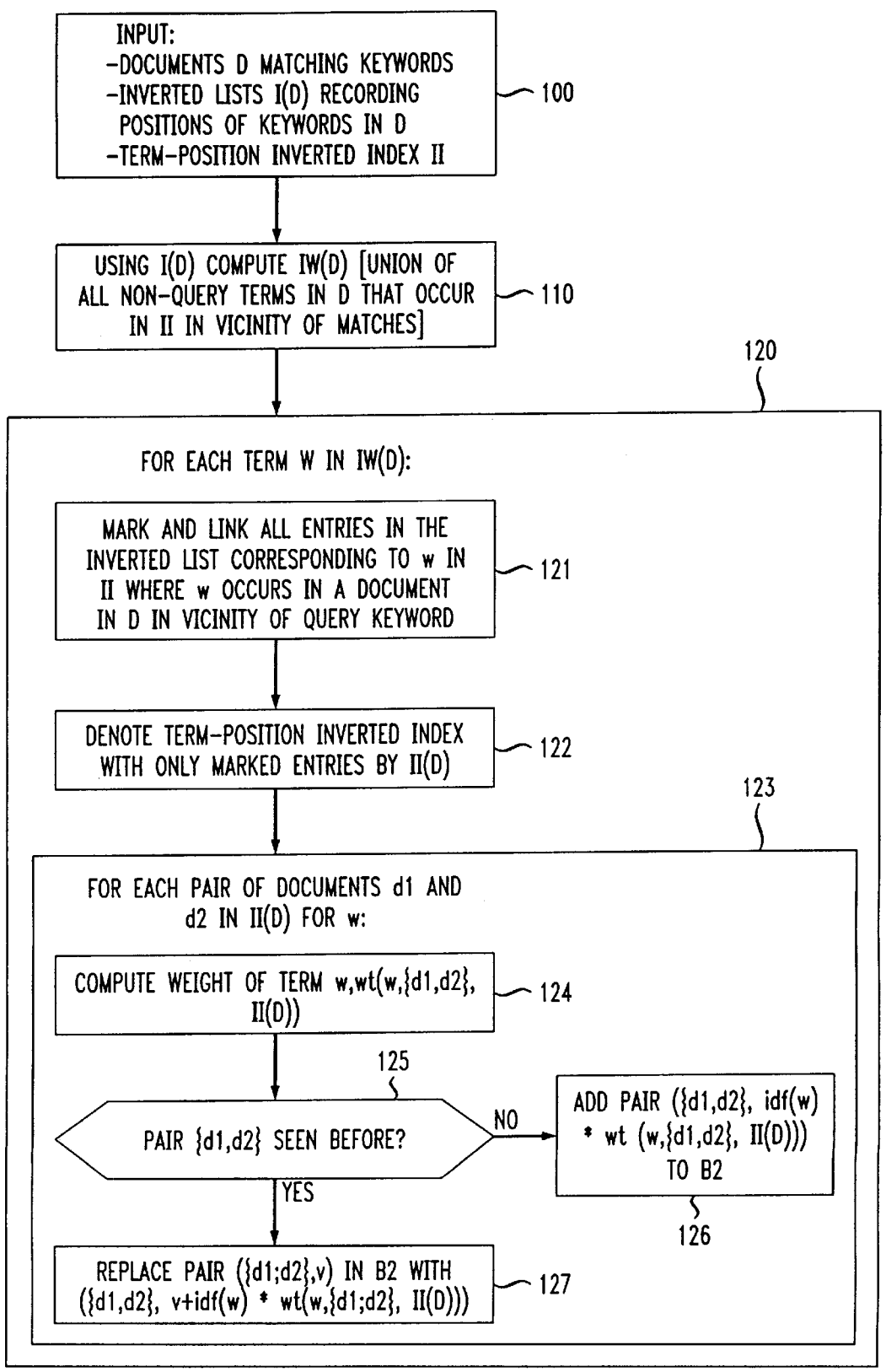
FIG. 1 provides a flow chart in accordance with the first portion of a method in accordance with an embodiment of the present invention.

Consider again the example of the query "rosehips cancer". The term counts of "rosehips", and "cancer" range in the tens of thousands. Assume for the moment that there are no documents that completely satisfy the query. In accordance with the present invention multiple clusters of documents can be identified. For example, only a small set of these documents deal both with Vitamin C or ascorbic acid which are known to be beneficial in reducing cancer and which is contained in rosehips. In fact, the occurrences of Vitamin C or ascorbic acid in the body of documents matching "rosehips" or "cancer" may be rare. Further, this term typically occurs in the vicinity of the query keywords in the matching documents. The present invention provides for clustering the documents matching the query keywords based on the occurrence of terms in the vicinity of query keywords, and weighting these terms using a standard measure such as an inverse document frequency. This results in the desired identification of a small number of clusters with high scores.

An important element for efficient query processing in the infrequent word joining operation of the present invention is the term-position inverted index, widely used in search engines to efficiently locate documents that match the query keywords. A term-position inverted index is a set of inverted lists, one for each term in the body of documents. Each inverted list contains entries for each document in which the term occurs, recording the positions within the documents where the term occurs. The invention also employs two additional data structures: a one-belief (1-belief) list that contains scores for each portion of the document containing a query word (or the entire document depending on the size of the document), indicating similarity of the portion of the document (or the entire document) to the query keywords; a two-belief (2-belief) list contains scores for pairs of portions of documents (or documents) indicating the similarity between the portions of documents (or documents). These belief lists are generated during query evaluation to contain intermediate results.

The process of the present invention can be generally thought of as constituting three major steps. First, the process must detect the documents in the universe of documents which match the query keywords. Second, having identified the matching documents it is necessary to determine the similarity between document pairs based on the co-occurrence of terms in vicinity of the query keywords in the documents. Third, document clusters are created and scores are assigned to each cluster based on the diversity of matches of documents in the cluster to the query keywords and the similarity between pairs of documents in the cluster.

In the first step of finding matching documents it is possible to use the term-position inverted index to compute these documents. In addition, 1-belief lists that contain partial and total scores of the matching documents, and inverted lists that record the positions within the matching documents where the query keywords occur, are also generated.

Let idf(w) denote the inverse document frequency of the term w. The inverse document frequency of the term w in corpus C is defined as idf(w)=log(|C|/|C(w)|), where C(w) is the set of documents in the corpus in which term w occurs; idf(w) is a non-negative number, and a larger value of idf(w) means that w is more infrequent in the corpus. The logarithm is used to achieve a flattening effect. II denotes the term-position inverted index. wt(w,d, II) represents the weight of term w in document d based on II. If the number of occurrences of term w in document d is not relevant then wt(w, d, II) is uniformly one for all w occurring in d. If the number of occurrence is relevant and different occurrences of w in d are considered independent of each other then, wt(w, d, II)=nocc(w, d, II), where nocc(w, d, II) is the number of occurrences of w in d present in the inverted index II. Using a measure like wt (w, d, II)=log(1+nocc(w, d, II)) achieves a flattening effect that gives importance to the number of term occurrences without assuming that term occurrences are independent of each other.

In accordance with the first step of the invention the partial score of every query keyword w in document d is computed as the product of idf(w) and wt(w, d, II). The score of an entire document is computed as the sum of the partial scores of all the query keywords in that document. Both the partial scores and the total scores are maintained in the 1-belief lists. The partial scores will be important in the clustering algorithm described below.

When only the documents with the top r scores are desired, this matching operation uses the partial ranking optimization, which substantially reduces the cost of query evaluation. This optimizing orders terms by increasing frequency so that the least frequent terms are evaluated earlier. It essentially keeps track of the top r documents as query evaluation progresses and terminates evaluation of a document as soon as it can be shown that the maximum score the document could achieve would not place it in the current set of r top ranked documents. Similar optimization can be used when only the documents whose scores exceed a threshold t are desired.

The second step of the general operation described in the application is explained with reference to FIG. 1. In this operation the similarity between document pairs is computed. This similarity is based on the co-occurrence of terms in the "vicinity" of the query keywords in documents that are located by the first step.

For short documents, the "vicinity" of the term can be assumed to be the entire document. This reflects the assumption that the location of the term does not significantly effect its import for short documents. For long documents, this assumption holds less validity and focusing attention on the portions of the documents that are in the vicinity of query keywords (that is within a certain number of terms of from the query keyword) is a technique of increasing our confidence in the score.

In this operation of computing similarities which is shown in FIG. 1 the term-position inverted index for computing the 2-belief list that contains scores of document pairs is used. These scores are computed using the matrix of inverse document frequency (idf(w)) of the term w and the weight wt (w, {d1, d2}, II) of the term w in the pair of documents d1 and d2, based on term position inverted index II. This computation of similarity generates the partial score of co-occurring term w in documents d1 and d2 as the product of idf(w) and wt (w, {d1, d2}, II). The score of a document pair is computed as the sum of the scores of all the co-occurring terms in that document pair.

This portion of the method is shown in greater detail in the flow chart of FIG. 1. In step 100 inputs are received. In particular, the inputs of interest are documents D matching keywords; inverted lists I(D) recording positions of keywords in D; and term-position inverted index II. In step 110 the system computes IW(D) using I(D). This constitutes a union of all non-query terms in D that occur in II in the vicinity of the matches to the query keywords. Step 120 then operates on each term in IW(D). In step 121 the method marks and links all entries in the inverted list corresponding to w in II where w occurs in the document in D in the vicinity of a query keyword. In step 122 the term-position inverted index is denoted using only marked entries by II(D). The method continues in step 123 to generate information regarding pairs of documents, e.g., d1 and d2 in II(D) for the term w. First in step 124, as part of the operation of step 123, there is a computation of the weight of term w, wt(w, {d1, d2}, II(D)). In the computation of the weight, in one embodiment it is said to equal log(nocc(w, d1, II(D))+nocc(w, d2, II(D))). Then it is determined in step 125 if the pair d1/d2 has been seen before. If the answer to the inquiry is no then that document pair d1/d2 is added with idf(w)*weight wt(w, {d1, d2}, II(D)) to the two-belief list d2 (step 126).

If the document pair d1/d2 has been seen before then the present invention replaces the pair ({d1, d2}, v) in the two-belief list d2 by ({d1, d2} v+idf(w)*wt (w, {d1, d2}, II(D))) (step 127).

For each entry ({d1, d2}, v) in the two-belief list d2, a score v is the desired similarity between the portions of documents d1 and d2 that are in the vicinity of the query words.

It is worth noting that the weight calculation may be based on the model of the two documents being concatenated together. Alternatively, it could be said that weight (w {d1, d2}, II(D))=log(1+nocc(w, d1, II(D)))×log(1+nocc(w, d2, II(D))).

When only the document pairs with the top "r" scores are desired, the operation of FIG. 1 can be easily modified to use the partial ranking optimization. Again, terms would have to be ordered by increasing frequency so that the least frequent terms in the IW(D) are evaluated earlier. Instead of keeping track of the top r documents, the optimization would keep track of the top r document pairs as the query evaluation progresses and terminate evaluation of a document pair as soon as it can be shown that the maximum score the document pair could achieve would not place it into the current set of "r" top ranked document pairs. A similar optimization can be used when only document pairs whose scores exceed a fixed threshold "t" are desired.

Figure 2:
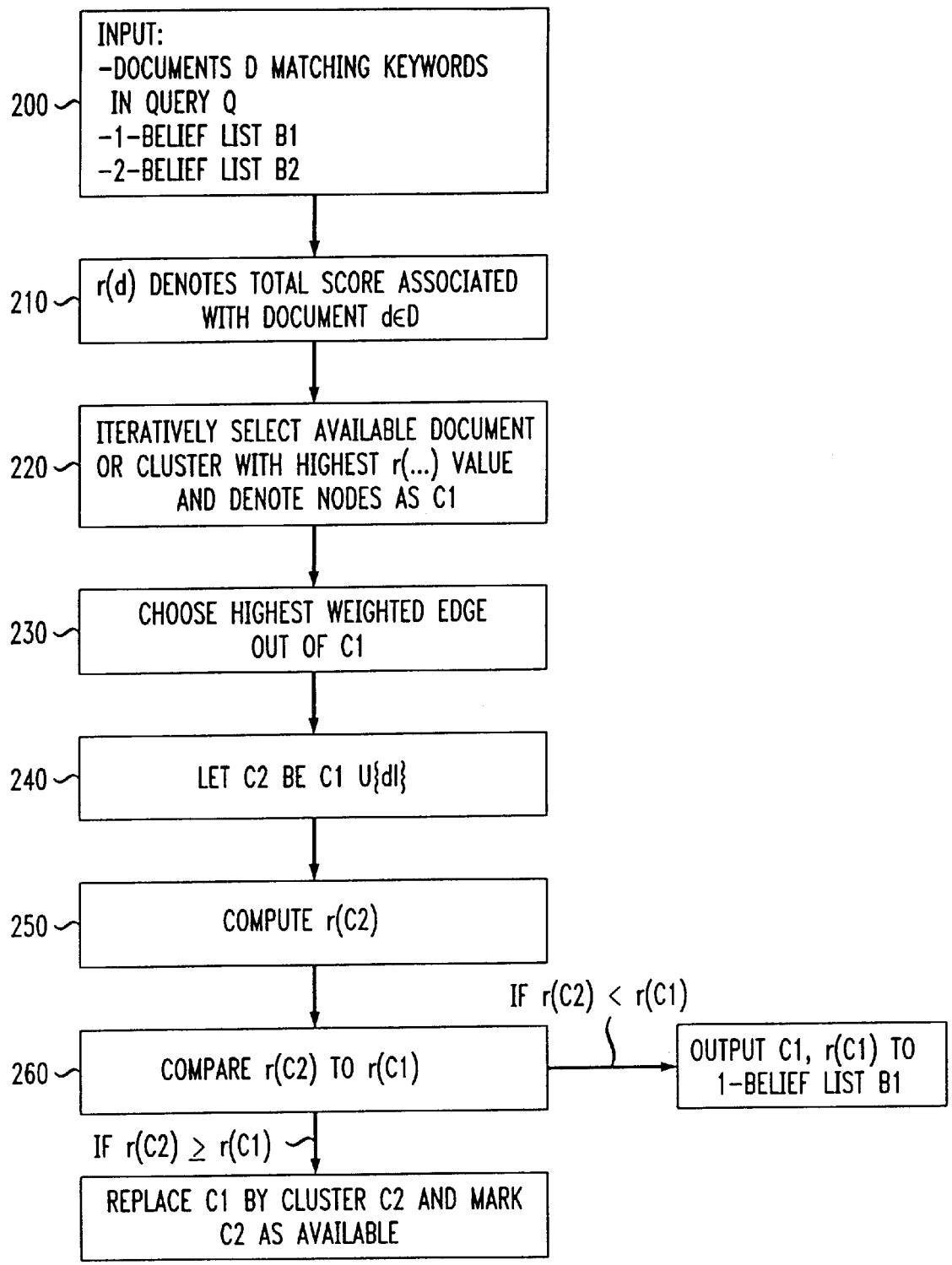
FIG. 2 illustrates a flow chart for performing a second portion of a method in accordance with an embodiment of the present invention.

The next step of the query processing strategy of the present invention is understood with reference with the flow chart of FIG. 2. In this portion of the process document clusters are created and scores are assigned to each cluster, based on the diversity of matches of documents in the cluster to the query keywords, and the similarity between pairs of documents in the cluster. The input to the clustering procedure shown in FIG. 2 is the set of 1-belief lists and 2-belief lists computed by the previous two steps in the query processing strategy. Let r(wd) denote the partial score of every query keyword w in the document d and let s({d1, d2}) denote the total score of the pair of documents d1 and d2. The score r (C) of a cluster of documents C is thus computed as follows:

1. For each query word w the partial scores are: (w, d) for d in the set of documents are combined to obtain r (w, C) which is the partial score of keyword w for the set of documents C. The combination function essentially determines the total number of occurrences of w in the set of documents c from the individual partial scores and then applies a flattening function. Thus, r(w, C) is larger than each individual r (w, d) that is much smaller than the sum of the various r (w, d)'s.

2. The scores are (w, C) for each query keyword w and the scores s ({d1, d2}) for d1, d2 as elements of cluster of document C are all added up. This sum is subsequently normalized by multiplying with the number, between zero and one, that indicates the number of and weights of edges between pairs of documents in C to obtain r (C) in the score of cluster C. If there are few edges and small weights on the edges this normalization number is closer to zero. With many edges and large weights on the edges this number is closer to one.

In the flow chart of FIG. 2 step 200 represents the acceptance of the input. Step 210 provides that r(d) denotes total scores associated with the document d as an element of the matching documents. In step 220 the present invention iteratively selects the available document or cluster with highest r( . . . ) value and denotes this set of nodes as C1. In a subsequent step the present invention chooses the highest weighted edge out of C1, step 230. C2 is set to C1 union {d1}, step 240. In step 250 the system computes r(C2). In step 260 the values r(C2) and r(C1) are compared to one another. If r(C2) is less then r(C1) then the system outputs (C1, r(C1)) to 1-belief list. If, however, r(C2) is $\geq$r(C1) then the system replaces C1 by cluster C2 and marks C2 as available. Ultimately, while both belief lists contain total scores, the 1-belief lists computed by the first step additionally contains partial scores, that is the similarity of documents to each query keyword. These partial scores are important for obtaining good estimates of the score of each cluster of document C. In the absence of these partial scores information about the distribution of query keywords among the cluster of documents would not be available, resulting in misleading scores for clusters.

The aim of traditional document clustering techniques has been to identify document-clusters such that any document in the cluster is representative of the set of all documents in the cluster. Consequently, these traditional techniques focus only on the similarity between pairs of documents in determining document clusters and do not take the query into account. The clustering algorithm of the present invention, however, differs significantly from traditional document clustering techniques, since the document clusters created have the property that the set of all documents in the cluster considered together is a better answer to the query than any single document in the cluster. In this, the computation of clusters attempts to balance the dual objectives of having a diversity of matches to the query keywords among the documents in the cluster and having inter-document similarity.

Having created the cluster(s) of documents the user is then presented with an identification of the individual clusters. The user can then select any one of these clusters for examination. At that time the user could also be presented with information regarding the terms which formed the basis for the clustering of the documents. Thus, information not readily apparent from the traditional presentation of search results would be provided to the user.

The above described method could be implemented as one integrated search engine as an alternative to known search engines such as Yahoo or Infoseek. Alternatively, the present invention could be employed as a post-search analytical tool in which case the two general steps described by way of the examples in FIGS. 1 and 2, could be operated on the search results provided by the traditional search engine.

This notion of matching pairs of documents based on infrequently occurring terms can also be applied to systems in which searches are conducted over structured databases and unstructured databases.

Typically, the two sets of documents (structured databases and unstructured databases) are considered distinct and separate. For the set of unstructured documents it is possible to construct an inverted index. That inverted index is a collection of pairs of the form $(k, S_k)$ where k is a key and $S_k$ is the set of pointers to documents in the set in which k key occurs. Some additional information, for example, positions of occurrences of key k in each document, frequency of occurrences of key k in each document, etc. may also be kept.

For efficient searches in a set of structured documents it is typical to build an attribute/value index. An attribute/value index for attribute "a" maintains a collection of pairs of the form $(v, S_v)$ where v is a key (an element of the domain of attribute a) and $S_v$ is the set of pointers to records in which v appears in attribute a. It is possible to separately retrieve record pointers $S_v$ matching each attribute/value pair v as an element of AV and then use conjunctive strategies for combining the various $S_v$'s. A more flexible approach for retrieving the records that match each of the set AV of attribute value pairs is to use the technique specified above only for a subset of AV. The set of records pointed to can then be individually matched against the attribute/value pairs. The decision on which subset of AV to choose as AV' is typically made in a cost-based fashion.

If, for example, the single keyword K is used to match the unstructured documents and a single attribute/value pair v is used to match the records in a relation of the structured database then let $S_k$ be the set of pointers to documents that match the keyword K and let $S_v$ be the set of pointers to records that match the attribute/value pair v. Two distinct alternatives exist to join elements from $S_k$ with elements $S_v$.

One alternative is to view any match of the keyword in unstructured document d with a keyword in some attribute of a record r in a structured database as a successful join, and the pair (dr) as an answer. The join can be restricted to user-specified attributes in the structured database to reduce the possibility of spurious answers. Furthermore, the join could be performed either starting from the records in $S_v$ and using the inverted index to obtain joinable and unstructured documents in $S_k$, or starting from the documents in $S_k$ and using attribute/value indexes to retrieve joinable records. This approach can result in a very large number of spurious answers matching keywords without guarantee that the document D and the record are semantically related.

In another alternative based on the infrequent matching notion described above, it is possible to declare a join between an unstructured document d and a record r to be successful only when there is a high probability that d and r are semantically related. Thus, a technique similar to that shown in computing the similarity between pairs of documents and creating and scoring clusters in accordance with FIGS. 1 and 2 respectively can be employed where the set of all documents D is constituted by the group of structured documents and the group of unstructured documents.

As a consequence of this further embodiment of the invention, a user can conduct a search across unstructured documents and structured documents using the same search query keywords and detect relationships between documents from these disparate sources. The document pairs are then scored and presented to the user in a prescribed order so that the information sought by the user, which might not be easily found in relation to the query keywords, can be presented as a cluster of documents or a pair of documents found in disparate document sources.

It should be recognized by those skilled in the art that the clustering operation of the present invention can be performed by a general purpose computer running software designed to execute the functionality described above. Furthermore, the documents in question can reside on one or more databases to which the computer has access either locally or through some network arrangement.

In conclusion, the present invention provides the capability of clustering documents which are related to one another in a way not immediately obvious to a user who has obtained the documents as the result of an execution of a general search. This is useful for providing additional sources of information to the end user and better grouping documents that may more likely be of interest to the user rather than merely providing large numbers of documents simply because they satisfy some portion or all of the keyword search query.

What is claimed is:

1. A method for clustering electronic documents in response to a search query, the method comprising the steps of:
    collecting a first set of electronic documents, each containing at least one occurrence of a first keyword from the search query;
    collecting a second set of electronic documents each containing at least one occurrence of a second keyword from the search query;
    combining said first set of electronic documents and said second set of electronic documents to create a collection of electronic documents, each electronic document in said collection containing at least one occurrence of a keyword from the search query;
    analyzing each electronic document in said collection to determine a content characteristic in a predefined neighborhood adjacent to at least one of said keywords from the search query;
    comparing content characteristics of each document in said collection of electronic documents to content characteristics of other documents in said collection; and
    creating a plurality of clusters of electronic documents, at least one cluster including at least two of said electronic documents in said collection of documents, wherein in a given cluster the electronic documents have overlapping content beyond a commonality of keywords from the search query.

2. The method of claim 1 wherein said content characteristics of a document include a list of words within a pre-defined proximity to the keywords in the document and which words each have a ratio of number of appearances in the document to number of appearances in the collection of documents that falls within a predetermined range, and wherein said overlapping content includes at least one word that appears on each document's list of words for the documents in the given cluster.

3. A method for finding responses to a search query that comprises a plurality of keywords, the method comprising the steps of:
    collecting a set of documents, each document containing at least one of said plurality of keywords;
    analyzing each document in said set to determine a content characteristic in a predefined neighborhood adjacent to at least one of said plurality of keywords in that document;
    comparing a content characteristic associated with a document in the set against the content characteristic of other documents in said set and determining a level of similarity of content characteristic for each pair of documents compared; and
    providing as query responses those document pairs having a level of similarity of content characteristic determined to be greater than a predetermined threshold.

4. The method of claim 3, comprising the further step of ranking said document pairs provided as responses based on the determined level of similarity of content characteristic for each such document pair and the presence of keywords from the search query.

5. The method of claim 3, wherein said level of similarity depends upon the degree of commonality between two documents as to non-keyword terms occurring in said pre-defined neighborhoods adjacent to the respective keywords within the respective documents of a pair of documents and which words each have a ratio of number of appearances in the document to number of appearances in the collection of documents that falls within a predetermined range.

6. A method for finding responses to a search query that comprises a plurality of keywords, the method comprising the steps of:
    collecting a set of documents, each document containing at least one of said plurality of keywords;
    for each document in said set, creating a list of terms appearing within a specified distance from one keyword found in the document where each term has associated therewith a ratio of number of appearances in the collection of documents that falls within a predetermined range;
    comparing the list of terms generated for each document to discover pairs of lists having commonality exceeding a first threshold; and
    presenting as responses to the search query document pairs corresponding to those pairs of lists determined to have commonality exceeding said first threshold.

7. The method of claim 6, wherein the presented responses include, with each document pair, a list of terms common to that document pair.

8. The method of claim 6, wherein said document pairs are presented in ranked order.

9. The method of claim 8 wherein said ranked order is based in part on the level of commonality of respective pairs of documents with regard to their respective list of terms.

10. The method of claim 9 wherein said ranked order is further based on the frequency that terms which form the basis of commonality of the list of terms appear in each respective document of the document pair.

11. A search engine for finding responses to a search query where responses are split across documents, said search engine comprising computer software operated on a processor and when operated performing the steps of:

collecting a set of documents, each document containing at least one of a plurality of keywords from the search query;

analyzing each document in said set to determine a content characteristic in a predefined neighborhood adjacent to at least one of said plurality of keywords in that document;

comparing a content characteristic associated with a document in the set against the content characteristic of other documents in said set and determining a level of similarity of content characteristic for each pair of documents compared; and providing as query responses those document pairs having a level of similarity of content characteristic determined to be greater than a predetermined threshold.

12. The search engine of claim 11 wherein said software ranks said document pairs provided as responses based on the determined level of similarity of content characteristic for each such document pair.

13. The method of claim 11, wherein said level of similarity depends upon the degree of commonality between two documents as to non-keyword terms occurring in said predefined neighborhoods adjacent to the respective keywords within the respective documents of a pair of documents and which words each have a ratio of number of appearances in the document to number of appearances in the collection of documents that falls within a predetermined range.

14. A method for obtaining responses to a search query containing a plurality of keywords to a universe of electronic documents where the responses are split across documents, the method comprising the steps of:

collecting a set of documents out of said universe of documents wherein each document matches at least one of the plurality of keywords;

determining similarity between pairs of documents within said set of documents to be able to assign a similarity score to each document pair;

creating document clusters using similarity scores assigned to respective document pairs;

ranking the created document clusters; and presenting the ranked document clusters as responses to the search query.

15. The method of claim 14 wherein said step of determining similarity between pairs of documents comprises the substeps of:

for a pair of documents, determining those co-occurring non-keyword terms, that is those terms appearing in both documents, in the vicinity of the query keywords in the respective documents of the pair;

calculating a similarity score based on the number of co-occurring non-keyword terms and a ratio of the frequency with which each co-occurring non-keyword term appears in each document of the pair to the frequency with which the co-occurring non-keyword term appears in the set of documents.

16. The method of claim 15 wherein said step of creating document clusters includes the sub-step of creating a cluster score for each pair of documents using the similarity score for that pair and the similarity of the documents in the pair to the search query.

17. A method for providing responses to a search query on the worldwide web where the responses are split across electronic documents, the method comprising the steps of:

collecting a set of documents, each document containing at least one of a plurality of keywords from the search query;

analyzing each document in said set to determine a content characteristic in a predefined neighborhood adjacent to at least one of said plurality of keywords in that document;

comparing a content characteristic associated with a document in the set against the content characteristic of other documents in said set and determining a level of similarity of content characteristic for each pair of documents compared; and providing as query responses URLs for those document pairs having a level of similarity of content characteristic determined to be greater than a predetermined threshold.

18. The method of claim 17, comprising the further step of ranking said document pairs provided as responses based on the determined level of similarity of content characteristic for each such document pair.

19. The method of claim 17, wherein said level of similarity depends upon the degree of commonality between two documents as to non-keyword terms occurring in said predefined neighborhoods adjacent to the respective keywords within the respective documents of a pair of documents and which words each have a ratio of number of appearances in the document to number of appearances in the collection of documents that falls within a predetermined range.

20. A method for finding responses to a search query directed to a universe of documents including a collection of structured documents and a collection of unstructured documents, the method comprising the steps of:

collecting a set of unstructured documents each containing a keyword of the search query;

collecting a set of structured documents each containing an attribute/value pair of the search query;

analyzing each document in the set of unstructured documents to determine a first content characteristic in a predefined neighborhood adjacent to at least one of said keywords from the search query;

analyzing each document in the set of structured documents to determine a second content characteristic in a predefined neighborhood adjacent to at least one of said attribute/value pairs from the search query;

comparing the first content characteristics of each document in the set of unstructured documents to the second content characteristic of every document in the set of structured documents; and based on the results of the comparing step, joining an unstructured document and a structured document as a response pair when that document pair contains a common keyword.

21. A method for finding responses to a search query directed to a universe of documents including a collection of structured documents and a collection of unstructured documents, the method comprising the steps of:

collecting a set of unstructured documents each containing a keyword of the search query;

collecting a set of structured documents each containing an attribute/value pair of the search query;

analyzing each document in the set of unstructured documents to determine a first content characteristic in a predefined neighborhood adjacent to at least one of said keywords from the search query;

analyzing each document in the set of structured documents to determine a second content characteristic in a predefined neighborhood adjacent to at least one of said attribute/value pairs from the search query;

comparing the first content characteristics of each document in the set of unstructured documents to the second content characteristic of every document in the set of structured documents; and based on the results of the comparing step, joining an unstructured document and a structured document as a response pair when the documents in that pair contain terms common to both documents in the pair which terms each have a ratio of number of appearances in the document to the number of appearances in the collection which satisfies a predetermined range.

22. The method of claim 21, wherein said response to the search query includes a plurality of response pairs in ranked order.

23. The method of claim 22, wherein there is provided with each response pair a list of terms common to the structured document and unstructured document constituting the response pair.

* * * * *